(12) United States Patent
Hong et al.

(10) Patent No.: US 7,289,258 B2
(45) Date of Patent: Oct. 30, 2007

(54) LIGHT MODULATOR HAVING VARIABLE BLAZE DIFFRACTION GRATING

(75) Inventors: Yoon Shik Hong, Gyeonggi-do (KR); Seung Hee Suh, Gyeonggi-do (KR); Min Suk Oh, Seoul (KR); Ohk Kun Lim, Gyeonggi-do (KR); Seung Heon Han, Seoul (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 139 days.

(21) Appl. No.: 11/171,625

(22) Filed: Jun. 30, 2005

(65) Prior Publication Data

US 2006/0072183 A1   Apr. 6, 2006

(30) Foreign Application Priority Data

Oct. 1, 2004   (KR) .................... 10-2004-0078402

(51) Int. Cl.
*G02B 26/00*   (2006.01)
*G02B 5/18*    (2006.01)

(52) U.S. Cl. ............. 359/290; 359/291; 359/292; 359/571; 359/572; 359/573

(58) Field of Classification Search ............... 359/290, 359/291, 292, 295, 298, 571, 572, 573, 900
See application file for complete search history.

(56) References Cited

U.S. PATENT DOCUMENTS

| | | | |
|---|---|---|---|
| 5,311,360 A | 5/1994 | Bloom et al. | |
| 6,445,502 B1 * | 9/2002 | Islam et al. | 359/571 |
| 2005/0243402 A1 * | 11/2005 | Yun | 359/291 |

* cited by examiner

*Primary Examiner*—Alicia Harrington
*Assistant Examiner*—Brandi Thomas
(74) *Attorney, Agent, or Firm*—Christensen O'Connor Johnson Kindness PLLC (57) ABSTRACT

The present invention relates, in general, to a light modulator having a variable blaze diffraction grating and, more particularly, to a light modulator having a variable blaze diffraction grating, in which a diffraction member rotates due to piezoelectric force so as to incline a reflective surface.

7 Claims, 6 Drawing Sheets

FIG. 1

PRIOR ART

FIG. 2

PRIOR ART

PRIOR ART

LIGHT MODULATOR HAVING VARIABLE BLAZE DIFFRACTION GRATING

BACKGROUND OF THE INVENTION

1. Field of the Invention

The present invention relates, in general, to a light modulator having a variable blaze diffraction grating and, more particularly, to a light modulator having a variable blaze diffraction grating, in which a diffraction member rotates due to piezoelectric force so as to incline a reflective surface.

2. Description of the Prior Art

Generally, optical signal processing technology has advantages in that a great amount of data is quickly processed in a parallel manner unlike a conventional digital information processing technology in which it is impossible to process a large amount of data in real-time, and studies have been conducted on the design and production of a binary phase only filter, an optical logic gate, a light amplifier, an image processing technique, an optical device, and a light modulator using a spatial light modulation theory.

Of them, the spatial light modulator is applied to optical memory, optical display, printer, optical interconnection, and hologram fields, and studies have been conducted to develop displays employing it.

Figure 1:
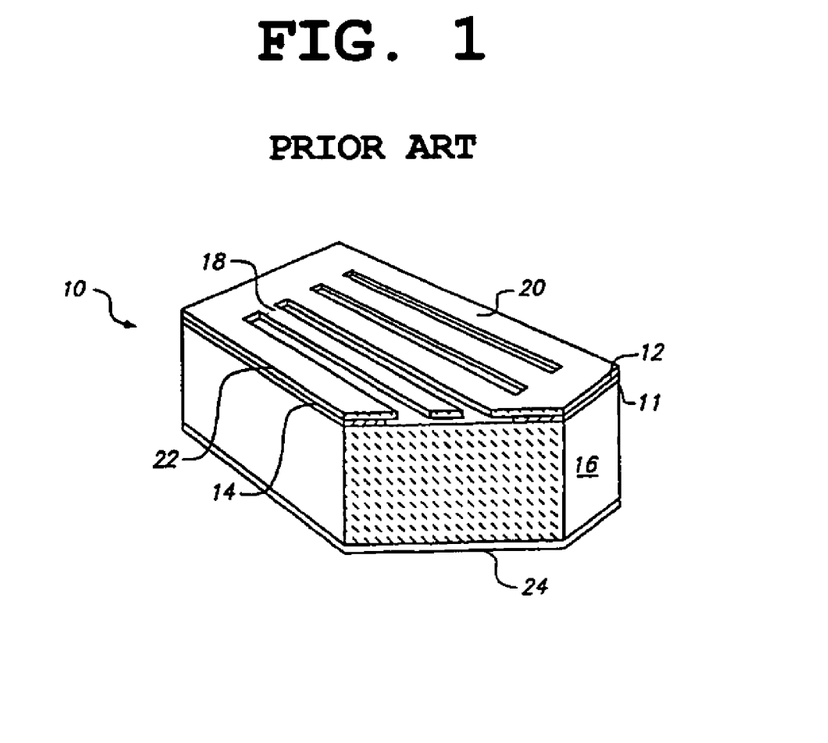
FIG. 1 illustrates an electrostatic-type grating light modulator according to conventional technology.

The spatial light modulator is embodied by a reflective deformable grating light modulator 10 as shown in FIG. 1. The modulator 10 is disclosed in U.S. Pat. No. 5,311,360 by Bloom et al. The modulator 10 includes a plurality of reflective deformable ribbons 18, which have reflective surface parts, are suspended on an upper part of a substrate 16, and are spaced apart from each other at regular intervals. An insulating layer 11 is deposited on the silicon substrate 16. Subsequently, a sacrificial silicon dioxide film 12 and a silicon nitride film 14 are deposited.

The nitride film 14 is patterned by the ribbons 18, and a portion of the silicon dioxide film 12 is etched, thereby maintaining the ribbons 18 on an oxide spacer layer 12 using a nitride frame 20.

In order to modulate light having a single wavelength of $\lambda_o$, the modulator is designed so that thicknesses of the ribbon 18 and oxide spacer 12 are each $\lambda_o/4$.

Limited by the vertical distance (d) between the reflective surface 22 of each ribbon 18 and the reflective surface of the substrate 16, the grating amplitude of the modulator 10 is controlled by applying voltage between the ribbon 18 (the reflective surface 22 of the ribbon 18 acting as a first electrode) and the substrate 16 (a conductive layer 24 of a lower side of the substrate 16 acting as a second electrode). In its undeformed state, with no voltage applied, the grating amplitude is $\lambda_o/2$ and the total round-trip path difference between light beams reflected from the ribbon and substrate is one wavelength $\lambda_o$, and thus; the phase of the reflected light is reinforced.

Figure 2:
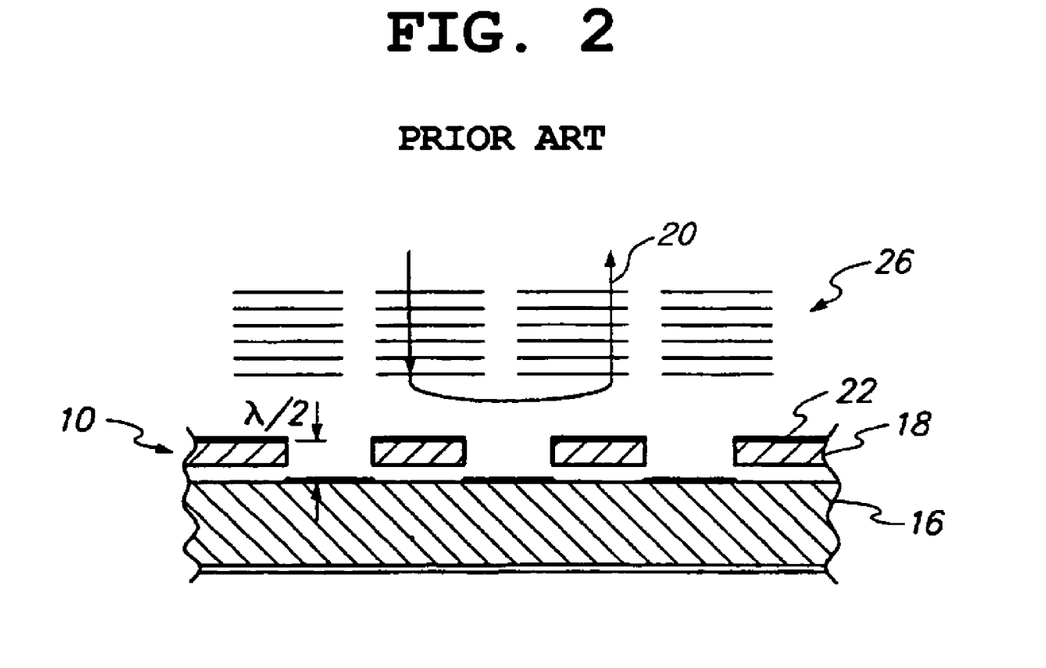
FIG. 2 illustrates reflection of incident light by the electrostatic-type grating light modulator in an undeformed state according to conventional technology.

Accordingly, in its undeformed state, the modulator 10 acts as a plane mirror when it reflects light. In FIG. 2, reference numeral 20 denotes incident light and reflected light in its undeformed state.

When a proper voltage is applied between the ribbon 18 and substrate 16, the electrostatic force enables the ribbon 18 to be moved downward toward a surface of the substrate 16. At this time, the grating amplitude is changed to $\lambda_o/4$. The total round-trip path difference is a half of a wavelength, and light reflected from the deformed ribbon 18 and light reflected from the substrate 16 are subjected to destructive interference.

Figure 3:
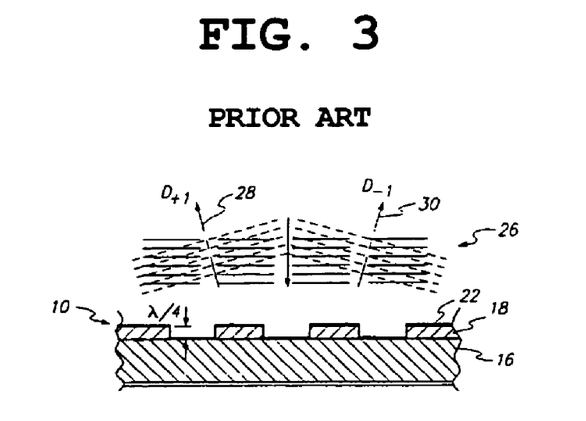
FIG. 3 illustrates diffraction of incident light by the grating light modulator in a deformed state due to electrostatic force, according to conventional technology.

The modulator diffracts incident light 26 resulting from the interference. In FIG. 3, reference numerals 28 and 30 denote light beams diffracted in a +/− diffractive mode (D+1, D−1) in a deformed state.

However, the Bloom's light modulator adopts an electrostatic method to control the position of the micromirror, which has disadvantages in that the operating voltage is relatively high (usually, 20 V or so) and the correlation between the applied voltage and the displacement is not linear, resulting in unreliable light control.

Meanwhile, Silicon Light Machines Inc. has suggested a blaze light valve device, in which blaze diffraction is conducted to control the intensity of light, as disclosed in Korean Patent Laid-Open Publication No. 2004-32908.

Figure 4:
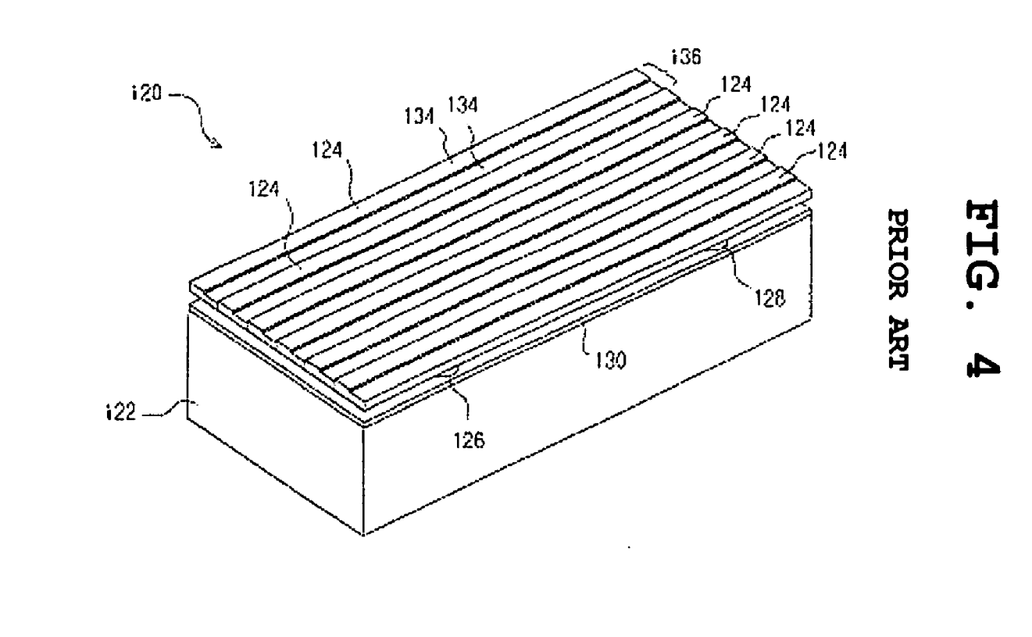
FIG. 4 is a perspective view of a blaze grating light valve (GLV) according to conventional technology.

FIG. 4 shows a perspective view of a blaze grating light valve according to conventional technology. The blaze grating light valve 120 comprises a substrate 122, elongate members 124, first posts 126 (only one post is shown), and second posts 128 (only one post is shown).

The substrate 122 includes a first conductor 130. It is preferable that each of the elongate members 124 include reflective first and second surfaces 132, 134. The first and second surfaces 132, 134 form a blaze profile 136 for the elongate member 124. One of the first posts 126 and one of the second posts 128 function to connect each elongate member 124 to the substrate 122. Furthermore, the elongate member 124 is connected to the substrate 122 at first and second ends thereof (not shown).

Figure 5:
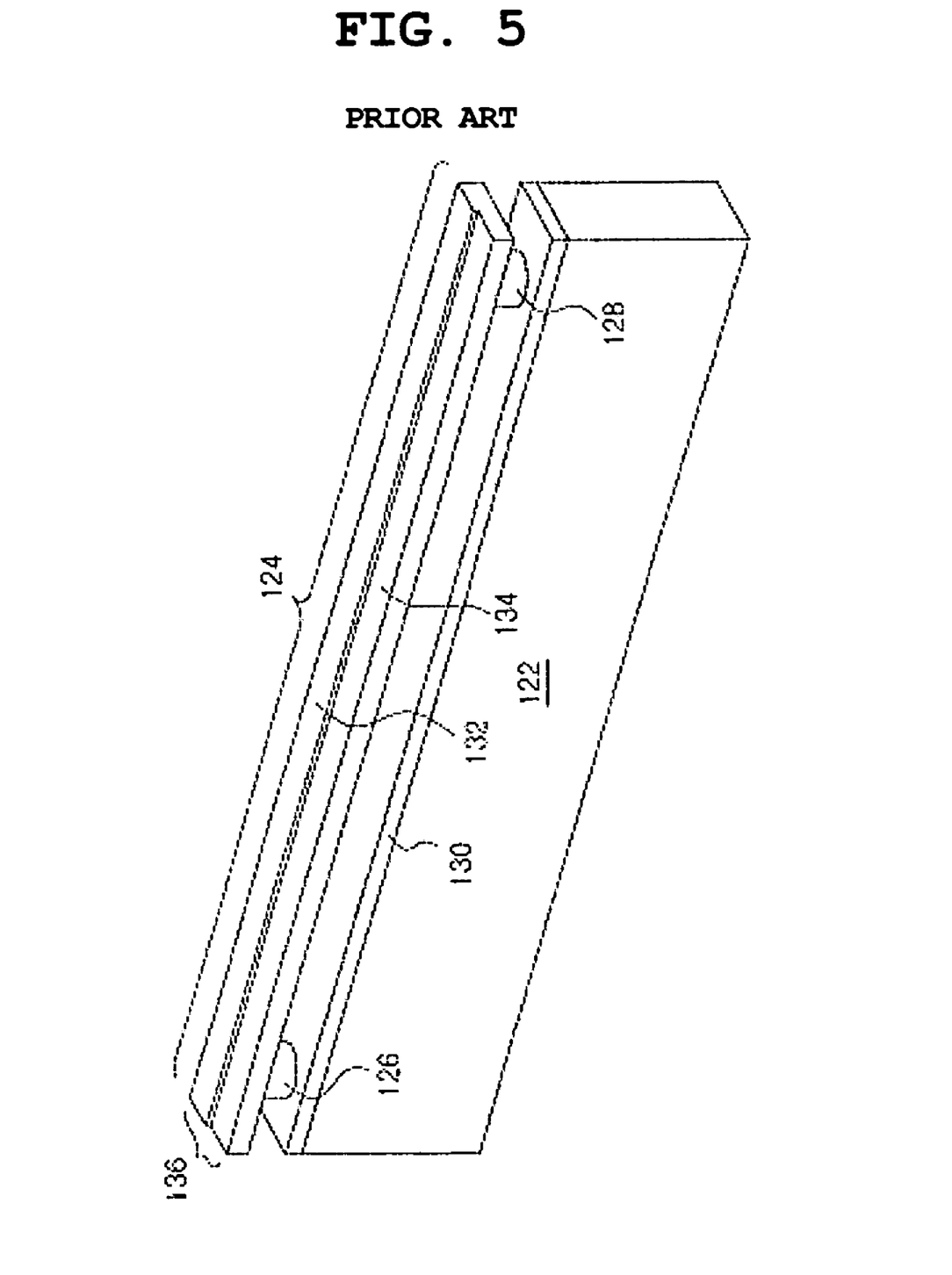
FIG. 5 is a perspective view of one elongate member and a lower substrate of the blaze grating light valve according to conventional technology.

FIG. 5 is a perspective view of one of the elongate members 124 and a portion of the substrate 122. Each elongate member 124 includes the reflective first and second surfaces 132, 134. The first and second surfaces 132, 134 form the blaze profile 136.

The elongate member 124 is connected through the first and second posts 126, 128 to the substrate at the first and second ends thereof (not shown). Preferably, the elongate members 124, the first posts 126, and the second posts 128 are made of an elastic material. It is preferable that the elastic material include silicon nitride.

Preferably, the first and second surfaces 132, 134 each include a reflector. It is preferable that the reflector include an aluminum layer. Alternatively, the reflector is made of another metal. Selectively, the reflector is a multilayer dielectric reflector. The substrate 122 includes the first conductor 130. Preferably, the substrate 122 includes silicone, and a first conductive layer is doped polysilicone. If a visible spectrum is used, the portion of the elongate member 124 between the first post 126 and the second post 128 has a length of about 200 μm and a width of about 4.25 μm.

Figure 6:
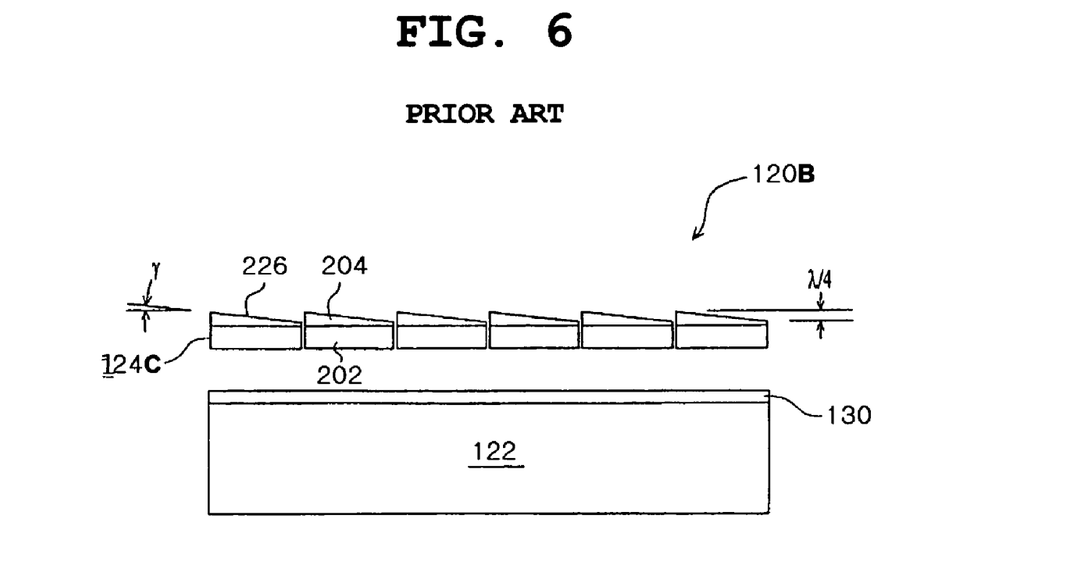
FIG. 6 illustrates a second grating light valve according to conventional technology.

FIG. 6 illustrates a second blaze grating light valve according to conventional technology. In the second blaze grating light valve 120B, a second elongate member 124C is used instead of the elongate member 124 of the blaze grating light valve 120. In the second elongate member 124C, a step profile 150 of the elongate member 124 is substituted by a flat surface 226 inclined at a blaze angle (γ).

Figure 7A:
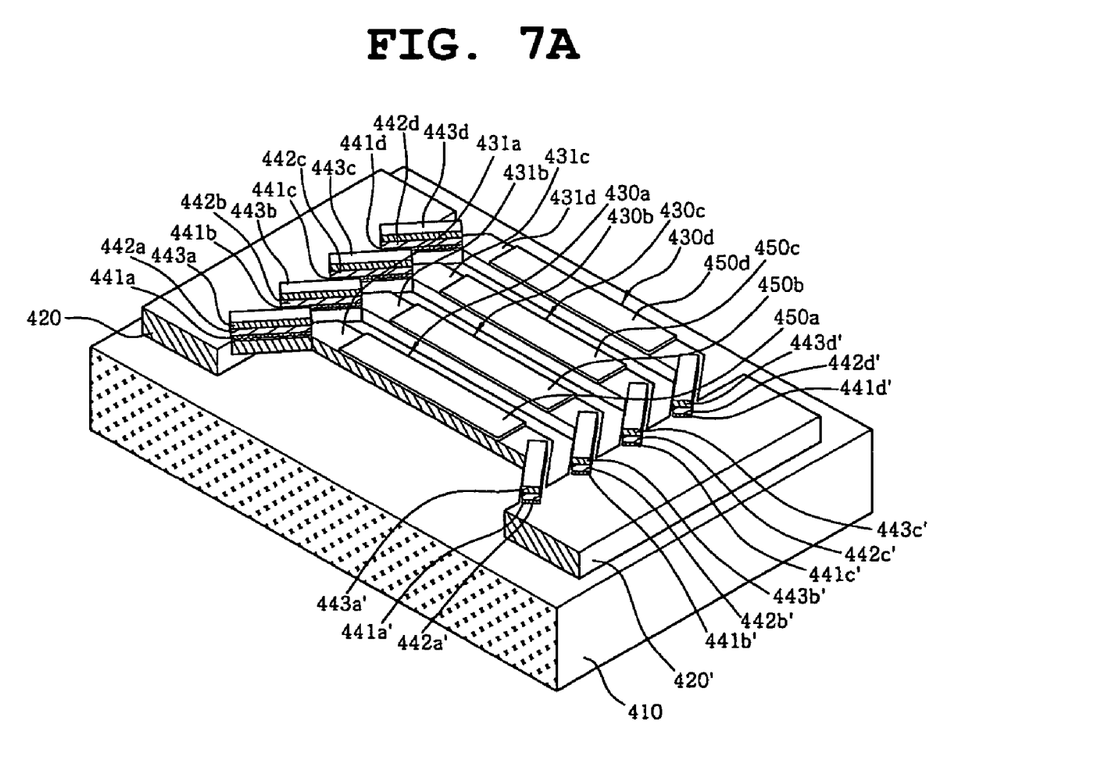
FIG. 7A is a perspective view of a light modulator having a variable blaze diffraction grating according to the present invention.

Meanwhile, U.S. Pat. No. 5,311,360 discloses a conventional blaze diffraction grating, which diffracts light by inclining a reflective surface using electrostatic force, as described in an example (FIG. 7) thereof. However, the conventional blaze diffraction grating (disclosed in the patent application of Silicon Light Machines Inc. as well as U.S. Pat. No. 5,311,360) is problematic in that the generation force per unit volume is insufficient because of the use of electrostatic force, thus rotation displacement efficiency per unit input is poor.

SUMMARY OF THE INVENTION

Therefore, the present invention has been made keeping in mind the above disadvantages occurring in the prior arts, and an object of the present invention is to provide a light modulator having a variable blaze diffraction grating, which has excellent rotation displacement efficiency per unit input.

The above object can be accomplished by providing a light modulator having a variable blaze diffraction grating. The light modulator comprises a substrate; a pair of supporting members, which are provided on the substrate and spaced apart from each other; a plurality of diffraction members, which are connected to the supporting members at both ends thereof so as to be suspended on the substrate, which are arranged parallel to each other, and which are transversely bent; a plurality of reflective plates having reflective surfaces on upper sides thereof, which are attached to upper sides of the plurality of diffraction members, the adjacent reflective surfaces of which are parallel to each other; and a plurality of driving units, which moves the diffraction members upward or downward so that the reflective surfaces of the adjacent diffraction members are situated at a first position, in which the reflective surfaces form a flat mirror, or at a second position, in which the reflective surfaces diffract the incident light, thereby causing outwardly bent portions of the diffraction members to be rotated more than inwardly bent portions of the diffraction members due to rotational force using piezoelectric material.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a detailed description will be given of the present invention, with reference to FIGS. 7A to 9.

Figure 7B:
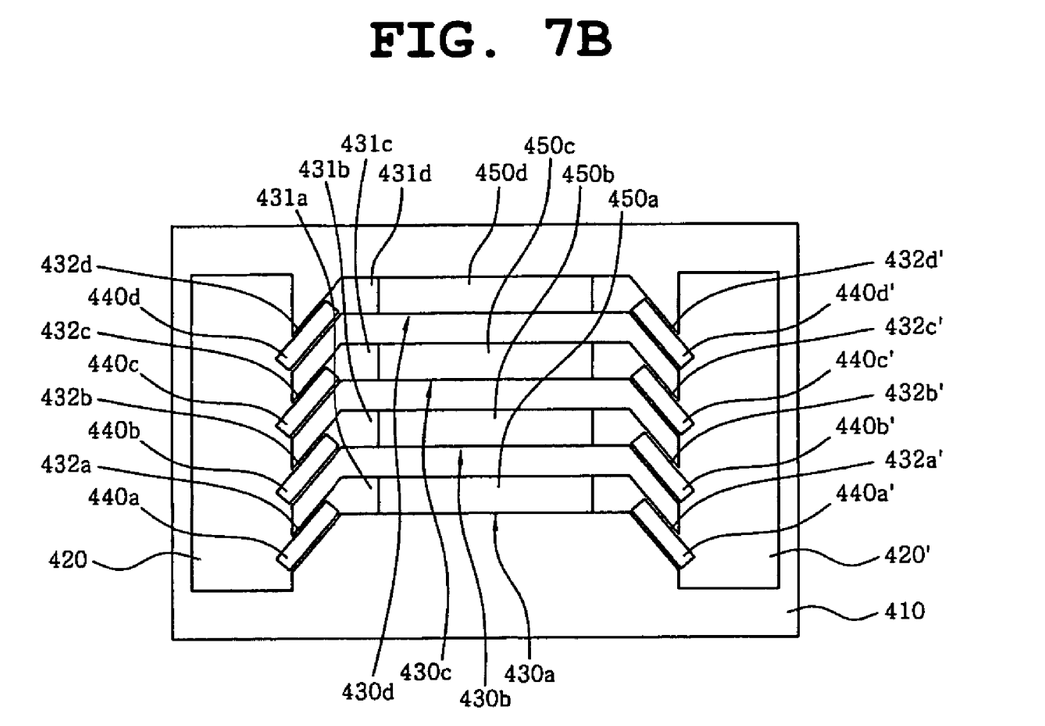
FIG. 7B is a plane view of the light modulator having the variable blaze diffraction grating according to the present invention.
Figure 7C:
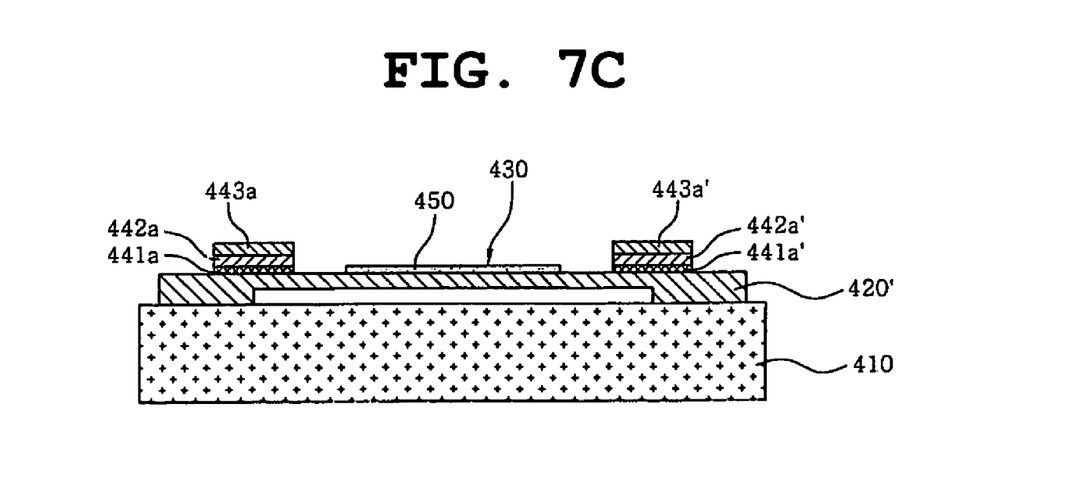
FIG. 7C is a front view of the light modulator having the variable blaze diffraction grating according to the present invention.

FIG. 7A is a perspective view of a light modulator having a variable blaze diffraction grating according to the present invention, FIG. 7B is a plane view of the light modulator having the variable blaze diffraction grating according to the present invention, and FIG. 7C is a front view of the light modulator having the variable blaze diffraction grating according to the present invention.

Referring to FIGS. 7A to 7C, the light modulator having the variable blaze diffraction grating according to the present invention comprises a substrate 410, a first supporting member 420, a second supporting member 420', diffraction members 430a-430d, first piezoelectric units 440a-440d, and second piezoelectric units 440a'-440d'.

The first supporting member 420 and the second supporting member 420' have a rectangular section, are attached to the substrate 410, and are opposite to and parallel to each other (refer to FIG. 7B). The diffraction members 430a-430d are attached to the supporting members at both ends thereof so that the diffraction members 430a-430d are suspended on the substrate 410.

The diffraction members 430a-430d include central parts 431a-431d, first external parts 432a-432d, and second external parts 432a'-432d'. Material for the diffraction members 430a-430d may be exemplified by Si oxides (e.g. $SiO_2$), Si nitrides (e.g. $Si_3N_4$), ceramic substrates (Si, $ZrO_2$, $Al_2O_3$), or Si carbides.

Reflective plates 450a-450d are provided on upper sides of the central parts 431a-431d to reflect incident light. Additionally, first ends of the first external parts 432a-432d are attached to the first supporting member 420, and second ends of the first external parts are inclinedly integrated with the central parts 431a-431d. Furthermore, second ends of the second external parts 432a'-432d' are attached to the second supporting member 420', and first ends of the second external parts are inclinedly integrated with the central parts 431a-431d.

Each of the first piezoelectric units 440a-440d is layered on an upper side of each first external part 432a-432d, and is provided on the first supporting member 420 at an end thereof and on the second end of the first external part 432a-432d at the other end thereof. Each of the second piezoelectric units 440a'-440d' is layered on an upper side of each second external part 432a'-432d', and is provided on the second supporting member 420' at an end thereof and on the first end of the second external part 432a'-432d' at the other end thereof.

With reference to FIGS. 7A to 7C, the first piezoelectric units 440a-440d include lower electrode layers 441a-441d, piezoelectric material layers 442a-442d, and upper electrode layers 443a-443d. The piezoelectric material layers 442a-442d are shrunken or expanded when voltage is applied to the lower electrode layers 441a-441d and the upper electrode layers 443a-443d, thereby generating upward or downward driving force.

Furthermore, referring to FIGS. 7A to 7C, the second piezoelectric units 440a'-440d' include lower electrode layers 441a'-441d', piezoelectric material layers 442a'-442d', and upper electrode layers 443a'-443d'. The piezoelectric material layers 442a'-442d' are shrunken or expanded when voltage is applied to the lower electrode layers 441a'-441d' and the upper electrode layers 443a'-443d', thereby generating upward or downward driving force.

With respect to this, electrode material for the lower electrode layers 441a-441d, 441a'-441d' may be exemplified by Pt, Ta/Pt, Ni, Au, Al, or $RuO_2$. Any of upper and lower piezoelectric materials and left and right piezoelectric materials may be used as the piezoelectric material layers 442a-442d, 442a'-442d'. The piezoelectric material for the piezoelectric material layers 442a-442d, 442a'-442d' may be exemplified by PZT, PNN—PT, PLZT, AIN, or ZnO, and piezoelectric electrolytic material containing at least one of Pb, Zr, Zn, or titanium may be used.

Electrode material for the upper electrode layers 443a-443d, 443a'-443d' may be exemplified by Pt, Ta/Pt, Au, Al, Ti/Pt, $IrO_2$, or $RuO_2$.

Meanwhile, a description will be given of movement and diffraction of the light modulator having the variable blaze diffraction grating according to the present invention, referring to FIGS. 7A to 7C and 9.

In the drawings, if piezoelectric voltage is applied to the first piezoelectric units 440a-440d, the piezoelectric units 440c, 440d (refer to FIG. 9) are shrunken by the occurrence of piezoelectric force, thus upward forces are generated at both ends of the piezoelectric units. At this time, the first ends of the piezoelectric units 440c, 440d are attached to the supporting member 420, thus the upward forces are applied to the supporting member 420. However, since the supporting member 420 is fixed, it is unmovable. The second ends of the piezoelectric units 440c, 440d are attached to the second ends of the first external parts 432c, 432d of the diffraction members 430c, 430d, thus upward forces are applied to the second ends of the first external parts 432c, 432d. Hence, the second ends of the first external parts 432c, 432d are lifted.

Figure 9:
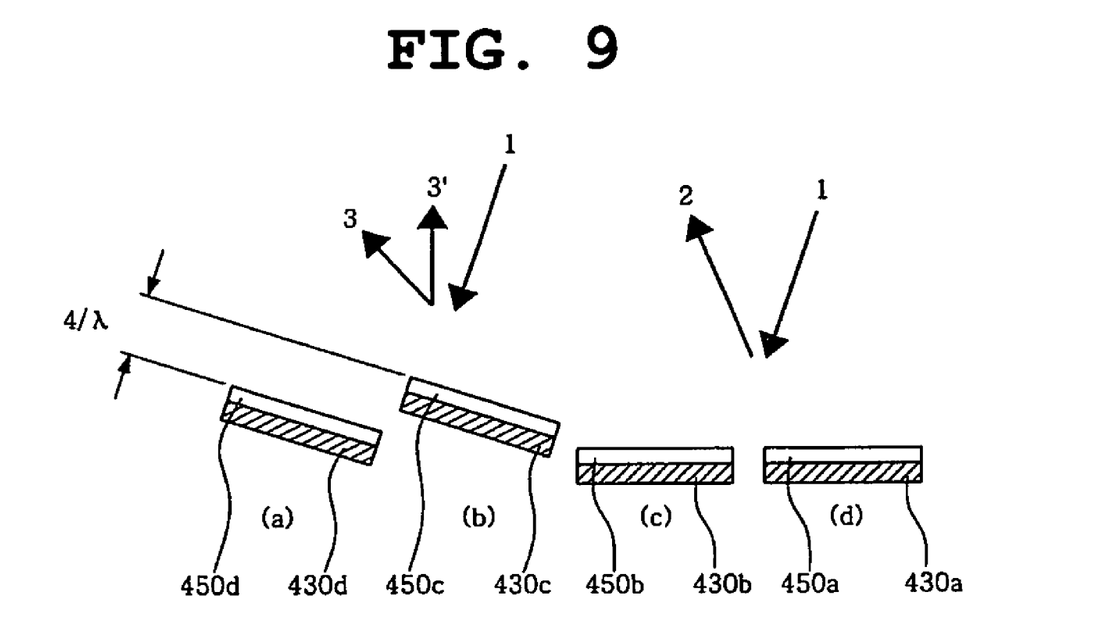
FIG. 9 illustrates diffraction of the variable blaze diffraction grating according to the present invention.

However, since the first external parts 432c, 432d are inclinedly integrated with the central parts 431c, 431d, the upward forces of the first external parts 432c, 432d cause rotation of the central parts 431c, 431d. In other words, since the diffraction members 430a-430d are bent, outwardly bent portions of the diffraction members are more deformed than inwardly bent portions of the diffraction members, thus the central parts 431c, 431d are inclined.

Meanwhile, if piezoelectric voltage is applied to the second piezoelectric units 440a'-440d', the piezoelectric units 440c', 440d' (refer to FIG. 9) are shrunken by the occurrence of piezoelectric force, thus upward forces are generated at both ends of the piezoelectric units. At this time, the second ends of the piezoelectric units 440c', 440d' are attached to the supporting member 420', thus the upward forces are applied to the supporting member 420'. However, since the supporting member 420' is fixed, it is unmovable. The first ends of the piezoelectric units 440c', 440d' are attached to first ends of the second external parts 432c', 432d' of the diffraction members 430c, 430d, thus upward forces are applied to the first ends of the second external parts 432c', 432d'. Hence, the first ends of the second external parts 432c', 432d' are lifted.

However, since the second external parts 432c', 432d' are inclinedly integrated with the central parts 431c, 431d, the upward forces of the second external parts 432c', 432d' cause rotation of the central parts 431c, 431d. In other words, since the diffraction members 430c, 430d are bent, outwardly bent portions of the diffraction members 430c, 430d are deformed more than inwardly bent portions of the diffraction members, thus the central parts 431c, 431d are inclined.

As described above, when the voltage is applied to both the first and second piezoelectric units 440a-440d, 440a'-440d', the diffraction members 430a-430d rotate by the resultant force of two piezoelectric forces, thus reflective surfaces are inclined.

As shown in FIG. 9, the reflective surfaces 450c, 450d of the inclined and adjacent diffraction members 430c, 430d are parallel to each other while being inclined. Furthermore, if the distance between upper sides of the inclined reflective surfaces is multiples of $\lambda/4$ when a wavelength of incident light is $\lambda$, diffraction occurs.

In FIG. 9, diffracted light beams 3, 3' are generated because the distance between the upper sides of the inclined reflective surfaces 450c, 450d is multiples of $\lambda/4$ when the wavelength of incident light 1 is $\lambda$. However, since the distance between upper sides of the reflective surfaces 450a, 450b is not multiples of $\lambda/4$, reflected light 2 is generated.

Figure 8:
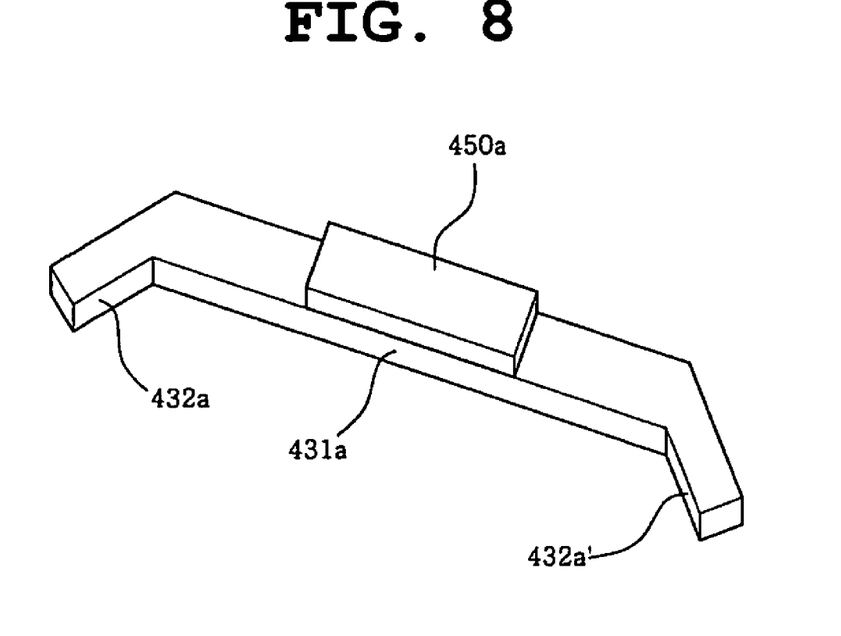
FIG. 8 is a perspective view of a diffraction member of FIG. 7A.

Meanwhile, FIG. 8 is a perspective view of a diffraction member, in which a first external part is inclinedly integrated with a central part and a second external part is inclinedly integrated with the central part. However, the diffraction member may have an arc shape.

A conventional blaze diffraction grating, which causes electrostatic-type distortion displacement, is problematic in that it is not useful to produce a small light modulator having high resolution and generating sufficient rotation force, because it has limited electrostatic driving force.

According to the present invention, since a variable micro blaze diffraction grating is driven using a piezoelectric device, such as PZT, the generation force per unit volume is great. Therefore, it is possible to develop a light modulator having small-sized multipixels, that is, high resolution.

Although a light modulator having a variable blaze diffraction grating according to the present invention has been disclosed for illustrative purposes, those skilled in the art will appreciate that various modifications, additions and substitutions are possible, without departing from the scope and spirit of the invention as disclosed in the accompanying claims.

What is claimed is:

1. A light modulator having a variable blaze diffraction grating, comprising:
   a substrate;
   a pair of supporting members, which are provided on the substrate and spaced apart from each other said supporting members defining a support at an elevation above the substrate;
   a plurality of elongate diffraction members:
      which are connected to the supporting members at an evaluation above the substrate to suspend the diffraction members above the substrate;
      which are arranged parallel to each other; and
      which are each composed of an elongate intermediate section and end sections extending laterally to a corresponding intermediate section and connected to the supporting members;
   a plurality of reflective plates having reflective surfaces on one side thereof, which are attached to the intermediate sections of the diffraction members to face away from the substrate, the adjacent reflective surfaces of which are parallel to each other; and
   a plurality of driving units, which move the intermediate sections of the diffraction members toward and away from the substrate so that the reflective surfaces of the adjacent diffraction members are situated at a first position, in which the reflective surfaces form a flat mirror, or at a second position, in which the reflective surfaces diffract the incident light, thereby causing the intermediate sections of the diffraction members to be rotated to a greater degree than the end sections of the diffraction members.

2. The light modulator as set forth in claim 1, wherein:
   the intermediate sections of the diffraction members rotate between the first and second positions; and
   the end sections of the diffraction members are attached to the supporting members at predetermined ends thereof and which integrated with the intermediate sections so as to convert upward or downward driving force caused by the driving units into rotational force and thus transfer the rotation force to the intermediate sections.

3. The light modulator as set forth in claim 2, wherein each of the driving units comprises:
   a first piezoelectric layer having a first piezoelectric material layer, which is provided on a first end section of the diffraction members such that an end of the first piezoelectric layer is positioned at a first end of the first end section and the other end of the first piezoelectric layer is positioned at a location spaced apart from a center of the first end section toward the first end of the first end section, so that the first piezoelectric layer shrinks or expands when voltage is applied to the first piezoelectric material layer, thereby giving the upward or downward driving force to the first end section; and a second piezoelectric layer having a second piezoelectric material layer, which is provided on a second end section of the diffraction members such that an end of the second piezoelectric layer is positioned at a second end of the second end section and the other end of the second piezoelectric layer is positioned at a location spaced apart from a center of the second end section toward the second end of the second end section, so that the second piezoelectric layer shrinks or expands when voltage is applied to the second piezoelectric material layer, thereby giving the upward or downward driving force to the second end section.

4. The light modulator as set forth in claim 3, wherein the first piezoelectric layer comprises:

a first lower electrode layer having a band shape, which is provided on the first end section such that an end of the first lower electrode layer is positioned at the first end of the first end section and the other end of the first lower electrode layer is positioned at a location spaced apart from the center of the first end section toward the first end of the first end section, so as to give piezoelectric voltage;

the first piezoelectric material layer, which is layered on the first lower electrode layer so as to shrink or expand when voltage is applied to both sides of the first piezoelectric material layer, thereby generating the driving force; and a first upper electrode layer, which is layered on the first piezoelectric material layer so as to provide the piezoelectric voltage, and the second piezoelectric layer comprises:

a second lower electrode layer having the band shape, which is provided on the second end section such that an end of the second lower electrode layer is positioned at the second end of the second end section and the other end of the second lower electrode layer is positioned at a location spaced apart from the center of the second external part toward the second end of the second end section, so as to give the piezoelectric voltage;

the second piezoelectric material layer, which is layered on the second lower electrode layer so as to shrink or expand when voltage is applied to both sides of the second piezoelectric material layer, thereby generating the driving force; and a second upper electrode layer, which is layered on the second piezoelectric material layer so as to provide the piezoelectric voltage.

5. The light modulator as set forth in claim 3, wherein the first piezoelectric layer comprises:

a first lower electrode layer having a band shape, which is provided on the first end section such that an end of the first lower electrode layer is positioned at the first end of the first end section and the other end of the first lower electrode layer is positioned at a location spaced apart from the center of the first end section toward the first end of the first external part, so as to give piezoelectric voltage;

a plurality of first piezoelectric material layers, which is layered on the first lower electrode layer so as to shrink or expand when voltage is applied to both sides of the first piezoelectric material layers, thereby generating the driving force;

a plurality of first upper electrode layers, which is interposed between the plurality of first piezoelectric material layers to provide the piezoelectric voltage; and a second upper electrode layer, which is layered on an uppermost layer of the plurality of the first piezoelectric material layers to provide the piezoelectric voltage, and the second piezoelectric layer comprises:

a second lower electrode layer having the band shape, which is provided on the second end section such that an end of the second lower electrode layer is positioned at the second end of the second end section and the other end of the second lower electrode layer is positioned at a location spaced apart from the center of the second end section toward the second end of the second end section, so as to give the piezoelectric voltage;

a plurality of second piezoelectric material layers, which is layered on the second lower electrode layer so as to shrink or expand when voltage is applied to both sides of the second piezoelectric material layers, thereby generating the driving force;

a plurality of third upper electrode layers, which is interposed between the plurality of second piezoelectric material layers to provide the piezoelectric voltage; and a fourth upper electrode layer, which is layered on an uppermost layer of the plurality of the second piezoelectric material layers to provide the piezoelectric voltage.

6. The light modulator as set forth in claim 1, wherein each of the driving units, comprises:

a first piezoelectric layer having a first piezoelectric material layer, which is provided on the diffraction members such that an end of the first piezoelectric layer is positioned at a first end of each of the diffraction members and the other end of the first piezoelectric layer is positioned at a location spaced apart from a center of each of the diffraction members toward the first end of each of the diffraction members, so that the first piezoelectric layer gives the upward or downward driving force to first ends of the diffraction members when voltage is applied to the first piezoelectric material layer, thereby rotating intermediate sections of the diffraction members; and a second piezoelectric layer having a second piezoelectric material layer, which is provided on the diffraction members such that an end of the second piezoelectric layer is positioned at a second end of each of the diffraction members and the other end of the second piezoelectric layer is positioned at a location spaced apart from the center of each of the diffraction members toward the second end of each of the diffraction members, so that the second piezoelectric layer gives the upward or downward driving force to second ends of the diffraction members when voltage is applied to the second piezoelectric material layer, thereby rotating the intermediate sections of the diffraction members.

7. The light modulator as set forth in claim 1, wherein the intermediate sections and the end sections of the diffraction members are disposed in substantially the same plane.

* * * * *